Nov. 17, 1953     J. L. DUNN     2,659,765
ELECTRICAL SPLICE BOX

Filed Dec. 28, 1951

INVENTOR.
JOSEPH L. DUNN
BY
*Henry G Dybvig*
HIS ATTORNEY

Patented Nov. 17, 1953

2,659,765

UNITED STATES PATENT OFFICE 2,659,765

ELECTRICAL SPLICE BOX

Joseph L. Dunn, Randolph Township,
Montgomery County, Ohio

Application December 28, 1951, Serial No. 263,739

4 Claims. (Cl. 174—65)

This invention relates to a junction box adapted for use in connecting into cables without severing the cable. Conventional boxes now in use provide what may be referred to as knock-out plugs, similar to those disclosed in the patent to Knell No. 2,000,851. patented May 7, 1935. In this type of box it is necessary to sever the cable and insert the severed ends through openings formed by removing the knock-out plugs.

An object of this invention is to provide a junction box having knock-out plugs, which box may be attached to a cable or a conduit without severing the wires of the cable, thereby facilitating additions to a circuit in a building that has previously been wired. This has been accomplished by providing oppositely disposed slots which permit the connecting of a box to a wire or cable without severing the cable.

Other objects and advantages reside in the construction of parts, the combination thereof and the mode of operation, as will become more apparent from the following description.

In the drawings, Figure 1 is a perspective view of a junction box incorporating marginal slots for receiving a cable, which box is shown without a cover plate.

Figure 1:
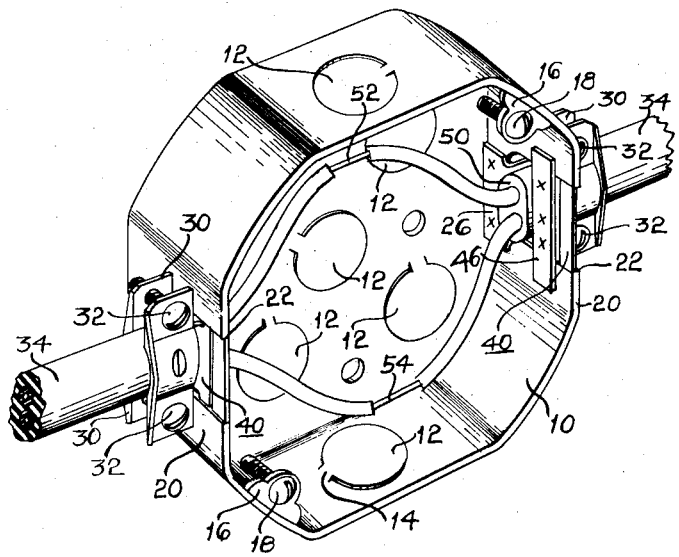

Referring to the drawings, the reference character 10 indicates a junction box for electrical circuits. It is substantially octagonal in shape. It is provided with a plurality of plugs 12 that may be removed, in that these plugs are severed through substantially the entire circumference, with the exception of a small tongue or fin 14. The plugs 12 are embossed, so as to be located substantially entirely within the box. These knock-out plugs are similar to the knock-out plugs now used in conventional junction and outlet boxes. The periphery of the box is provided with a pair of inwardly directed lugs or tabs 16, having threaded apertures adapted to receive retaining screws 18 threadedly engaging the apertures and used in holding a metal plate 60, forming a cover for the junction box. The structure described thus far is conventional, with the exception of a portion of the box 10.

Figure 2:
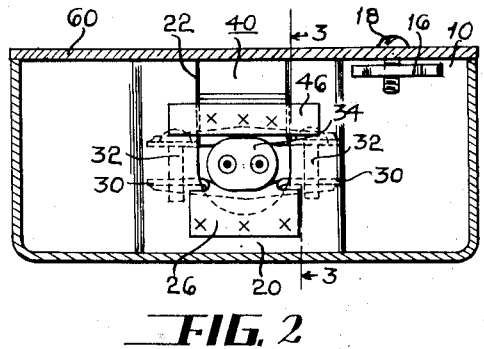
Figure 2 is a cross sectional view of the junction box shown in Figure 1, shown with the cover plate in position.
Figure 3:
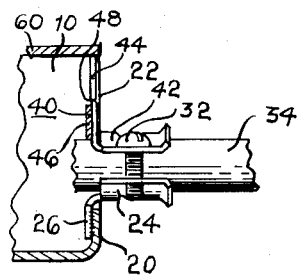
Figure 3 is a fragmentary, cross sectional view, taken substantially on the line 3—3 of Figure 2.

Each of the oppositely disposed sides or walls 20 of the box 10 has been provided with inwardly directed slots 22. A clamping member 24 has a flange 26 that overlaps the inner wall 20 of the box. The clamping member 24 is mounted in the bottom of the slot 22, as viewed in these figures. The flange 26 is spot-welded, or otherwise secured to the wall 20, so as to permanently position the clamping member 24. The horizontal portion of the clamping member 24, as viewed in Figures 2 and 3, is provided with outwardly directed extensions 30. These extensions are preferably threaded and receive threaded screws 32, one on either side of a cable 34. The center portion of the clamping member 24 is curved slightly, so as to conform to the cable 34.

A slot closure and clamping member 40 is provided with a horizontal portion 42 cooperating with the clamping member 24 to firmly grip and clamp the cable 34. The member 40, in addition to the clamping portion 42, is provided with a wall portion 44 seated in the slot 22, so as to close this slot. In order to properly align the wall portion 44, a retaining strip or band 46, spot-welded to the inner side of the wall 44, has extensions overlapping the wall 20. The wall portion 44 has been provided with score lines or grooves 48, so that different sizes of cable may be used in the box. The wall portion may be broken along the score lines so as to reduce the height thereof to provide the necessary space between the two clamping members 24 and 42. In that event, longer screws must be used than the screws shown in Figures 2 and 3.

The box, having the cover removed and members 40 removed, may be inserted upon the insulated cable in any desirable position without cutting the cable. The clamping and wall members 42 are then clamped over the cable; but before being clamped tightly in position, the cable may be deflected slightly, so as to form a slight loop in the cable within the box. The insulation of the cable may then be severed at 50 adjacent the inner walls of the box. The portion of the insulation of the cable located in the box is then removed from the insulated wires embedded in the cable. The insulation on the wire may be skinned for a short distance, as shown at 52 and 54. An auxiliary cable, not shown, may then be projected through one of the openings formed by removing a suitable knock-out plug 12. The wires in this cable may then be connected to the exposed portions of the wires at 52 and 54, the connections being properly taped and the cover 60 placed in position and held by the screws 18. A suitable clamp now appearing on the market may be used for clamping the auxiliary cable to the box.

The junction box disclosed herein lends itself very readily to addition to the wiring system so as to provide a proper junction box, or outlet box, as the case may be, without severing the main wires of the wiring system. By properly taping the joints formed, a safe and fireproof installation may be provided.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A junction box for use in connecting an additional circuit to a cable already installed, said junction box being provided with a bottom and side walls, the bottom and side walls being provided with knock-out plugs, a pair of oppositely disposed side walls being provided with slots extending inwardly towards the bottom of the side walls, two pairs of clamping members cooperating with said slots to permit the unsevered cable to be inserted in the slots and still be capable of being fastened to the box, there being one pair for each slot, one of the clamping members of each pair being provided with a flange overlapping the inner wall of the box and welded thereto, said clamping member having a clamping portion located on the outside of the box, said clamping portion being provided with extensions having threaded apertures, the cable being positioned on one clamping member of each pair, the other clamping member of each pair being provided with a wall portion used in closing the slot above the cable already installed, said second clamping member being provided with apertures, screws extending through said apertures and threadedly engaging the extensions for clamping the cable in position between the clamping members of each pair, the wall portion of the second clamping member of each pair being provided with a score line or reduced portion permitting the breaking off of a part of the wall portion so as to reduce the wall portion to the proper height, and a cover for closing the box, said cover contacting the walls of the box and associated with the wall portions of the clamping members to close the box.

2. A junction box according to claim 1, wherein the second clamping member of each pair of clamping members is provided with a retaining member overlapping the margin of the slot on the inner side of the box so as to hold the wall portion of the clamping member aligned with the wall of the box.

3. A junction box for use in connecting an additional circuit to a cable already installed, said junction box being provided with a bottom and side walls, the bottom and side walls being provided with knock-out plugs, a pair of oppositely disposed side walls being provided with slots extending inwardly towards the bottom of the side walls, two pairs of clamping members cooperating with said slots to permit the unsevered cable to be inserted in the slots and still be capable of being fastened to the box, there being one pair for each slot, one of the clamping members of each pair being fixedly attached to the box and aligned with the bottom of one of the slots, said clamping member having a clamping portion located on the outside of the box, said clamping portion being provided with extensions having threaded apertures, the cable being positioned on one clamping member of each pair, the other clamping member of each pair being provided with a wall portion used in closing the slot above the cable already installed, said second clamping member being provided with apertures, screws extending through said apertures and threadedly engaging the extensions for clamping the cable in position between the clamping members of each pair, the wall portion of the second clamping member of each pair being provided with a score line or reduced portion permitting the breaking off of a part of the wall portion so as to reduce the wall portion to the proper height, and a cover for closing the box, said cover contacting the walls of the box and associated with the wall portions of the clamping members to close the box.

4. A junction box for use in connecting an additional circuit to a cable already installed, said junction box being provided with a bottom and side walls, the bottom and side walls being provided with knock-out plugs, a pair of oppositely disposed side walls being provided with slots extending inwardly towards the bottom of the side walls, two pairs of clamping members cooperating with said slots to permit the unsevered cable to be inserted in the slots and still be capable of being fastened to the box, there being one pair for each slot, one of the clamping members of each pair being fixedly attached to the box so as to have a cable engaging portion located on the outside of the box near the bottom of an adjacent slot, said clamping member having a clamping portion located on the outside of the box, said clamping portion being provided with extensions having threaded apertures, the cable extending through the box being positioned on one clamping member of each pair, the other clamping member of each pair being provided with a wall portion used in closing the slot above the cable already installed, said second clamping member being provided with apertures, screws extending through said apertures and threadedly engaging the extensions for clamping the cable in position between the clamping members of each pair, and a cover for closing the box, said cover contacting the walls of the box and associated with the wall portions of the clamping members to close the box.

JOSEPH L. DUNN.

References Cited in the file of this patent

UNITED STATES PATENTS

| Number | Name | Date |
|---|---|---|
| 2,097,695 | Kingdon | Nov. 2, 1937 |
| 2,411,018 | Benander | Nov. 12, 1946 |

FOREIGN PATENTS

| Number | Country | Date |
|---|---|---|
| 39,310 | Switzerland | July 29, 1907 |
| 725,845 | France | May 18, 1932 |